United States Patent [19]

Bernard et al.

[11] Patent Number: 5,136,608
[45] Date of Patent: Aug. 4, 1992

[54] GAS RING-LASER

[75] Inventors: Walter Bernard, Daiseudorf; Klaus Langner, Überlingen; Werner Neumann, Owingen, all of Fed. Rep. of Germany

[73] Assignee: Bodenseewerk Geratetechnik GmbH, Fed. Rep. of Germany

[21] Appl. No.: 702,227

[22] Filed: May 17, 1991

[30] Foreign Application Priority Data

May 29, 1990 [DE] Fed. Rep. of Germany ....... 4017188

[51] Int. Cl.⁵ .............................................. H01S 3/083
[52] U.S. Cl. ..................................................... 372/94
[58] Field of Search .......................................... 372/94

[56] References Cited

U.S. PATENT DOCUMENTS

| | | | |
|---|---|---|---|
| 4,271,397 | 6/1981 | Stiles et al. | 372/94 |
| 4,926,437 | 5/1990 | Ford | 372/94 |
| 5,020,911 | 6/1991 | Gauert et al. | 372/94 |
| 5,022,759 | 6/1991 | Ficalora | 372/94 |
| 5,022,761 | 6/1991 | Kennedy | 372/94 |
| 5,027,367 | 6/1991 | Rea et al. | 372/94 |

Primary Examiner—John D. Lee
Assistant Examiner—Robert E. Wise
Attorney, Agent, or Firm—Lee, Mann, Smith, McWilliams, Sweeney & Ohlson

[57] ABSTRACT

A gas ring-laser comprises a ceramic block containing a closed gas-filled channel (12) which extends along the sides of an equilateral triangle and forms a resonant cavity. An anode (64) and cathodes (76, 78) permit the creation of two gas discharges. With the aid of dielectric mirrors (26, 28 and 30), two light beams circulating in opposite directions are guided through the channel. In order to simplify construction, the ceramic block (10) consists of a glass ceramic which is produced from a green ceramic body by sintering. The mirrors (26, 28, 30) are located in adjustable metal holders (80, 82, 84) and fixed in the ceramic block (10) by means of glass solder (98). In addition, the other electrical connections for the electrodes in the cavity are sealed in place by glass solder. The invention also relates to a method for manufacturing such a gas ring-laser. The gas ring-laser may serve as an inertial sensor for measuring angular velocities by means of the Sagnac-effect.

18 Claims, 1 Drawing Sheet

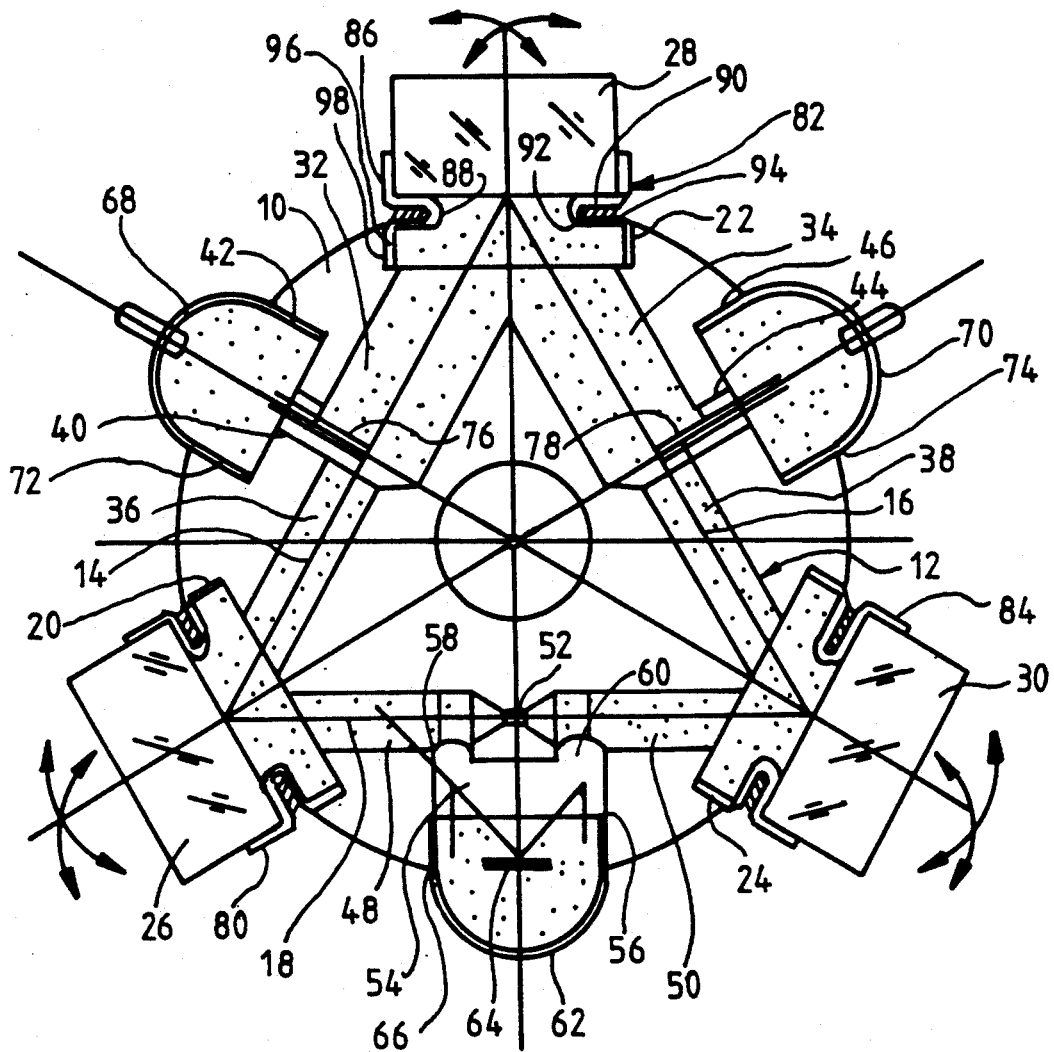

GAS RING-LASER

The invention relates to a gas ring-laser comprising a ceramic block containing a closed, gas-filled channel forming a cavity, electrodes for creating a gas discharge, and mirrors for causing two light beams to circulate in opposite directions in the channel.

Such ring-lasers in the form of helium-neon ring-lasers are known. They serve for measuring angular velocities by means of the Sagnac-effect in inertial spaces. Such ring-lasers formed in a ceramic block have the advantage that they withstand very high accelerations.

Helium-neon ring-lasers comprised in a ceramic block are known. In the known cases, the ceramic block consists of a glass ceramic block. The oppositely directed circulating light beams are guided by means of dielectric mirrors. These mirrors reflect with a very high efficiency at the wavelengths used in the ring-laser. Partial light beams are diverted out from the main circulating beams and are caused to interfere so as to produce a beat frequency which is proportional to the angular velocity about an axis perpendicular to the plane of the ring-laser.

A ring-laser of this type consists of a ceramic block, incorporating a channel which extends along the sides of an equilateral triangle. In the middle of one of the sides of the triangle, there is provided a constriction (pinhole) which limits the cross-sectional area of the circulating beams. An anode is situated within a recess in the ceramic block in the vicinity of this constriction. A cathode is situated at the centre of each of the other two sides of the triangle. At each of the corners, there is provided a dielectric mirror which is arranged at right angles to the line bisecting the adjacent sides of the triangle, the mirrors serving to guide the light beams in both directions around the sides of the triangle.

The manufacture of the known type of ring-laser using a ceramic block is extremely expensive. It requires machining of a glass ceramic. The dielectric mirrors are held in place on a highly accurately formed optically flat surface by optical cohesion. It is thus essential that the glass ceramic be very accurately machined right from the start. In known ring-lasers of this type, the electrical lead-ins are provided using indium sealing technology.

The object of the invention is thus to produce a gas ring-laser in the form of a ceramic block in a simpler and cheaper manner than was possible for known ring-lasers of this type.

This object is achieved in that in a gas ring-laser of the type defined hereinabove, the ceramic block consists of a glass ceramic which is produced from a green ceramic body by sintering.

Green ceramic is a material that can be machined i.e. drilled, turned and milled. A glass ceramic can be obtained from such a green ceramic by means of a sintering process.

The mirrors can be fixed in adjustable metallic holders into the ceramic block by glass solder. After soldering, it is possible to make exact adjustments to the mirrors in these adjustable holders.

Metallic connections into the cavity can be sealed by means of glass solder, thus avoiding the use of the expensive indium sealing technique.

Accordingly, a method of manufacturing a gas ring-laser of this type comprises the steps of:

(a) pressing-out a blank from green ceramic, (b) machining the blank and (c) heating the machined blank so as to convert the green ceramic into a glass ceramic by sintering.

After sintering, the adjustable holders with their mirrors may be fixed by means of glass solder into recesses provided in the outer curved surface of the glass ceramic block and then, after complete assembly of the gas ring-laser and heating of the ceramic block, the mirrors can be adjusted in their adjustable holders.

In addition, the electrodes may be fixed into the glass ceramic block by means of glass solder.

An embodiment of the invention will now be described with reference to the accompanying drawing which depicts a section through a helium-neon ring laser that is suitable for measuring angular velocities by means of the Sagnac-effect.

The helium-neon ring laser comprises a flat-cylindrical ceramic block 10 consisting of a glass-ceramic. A guide channel 12 is formed in the block, in a plane which is located at right angles to the central axis of the cylinder. This guide channel 12 extends along the sides 14, 16 and 18 of an equilateral triangle. The corners of the equilateral triangle lie on the curved outer surface of the cylindrical ceramic block. Flat-cylindrical recesses 20, 22, and 24 are formed in the curved outer surface of the ceramic block in the general area of the corners of the equilateral triangle. The recesses 20, 22, 24 intersect the guide channel. Dielectric mirrors 26, 28 and 30 are located at the corners of the equilateral triangle. The corners of the equilateral triangle each lie on a respective mirror plane. The mirror planes are located at right angles to lines which bisect the angles of the equilateral triangle. Consequently, a light beam travelling along one of the sides of the equilateral triangle will be reflected along the adjacent side of this triangle. In other words, the arrangement of mirrors is such as to guide a light beam either clockwise or anti-clockwise along the sides 14, 16 and 18 of the equilateral triangle.

The parts of the guide channel which extend along the two sides 14 and 16 of the equilateral triangle each have a section, 32 and 34 respectively, of greater cross-sectional area and a capillary section, 36 and 38 respectively. The section 32 extends somewhat beyond the line bisecting the angle between the sides 16 and 18 of the equilateral triangle. A radial channel 40 leads out from the section 32. The channel 40 runs along the said line bisecting the angle between the sides 16 and 18. The channel 40 leads into the base of a flat-cylindrical recess 42 which is provided in the curved outer surface of the ceramic block 10. In a similar manner, the section 34 extends to a small extent beyond the line bisecting the angle between the sides 14 and 18 of the equilateral triangle. A radial channel 44 runs along this line bisecting the angle between the sides 14 and 18. The channel 44 leads into the base of a flat-cylindrical recess 46 which is provided in the curved outer surface of the ceramic block 10.

The part of the guide channel 12 running along the side 18 of the equilateral triangle contains a first capillary section 48 and a second capillary section 50. A constriction (pinhole) 52 of the guide channel 12 is formed between the sections 48 and 50.

A recess 54 is provided in the ceramic block 10 in the vicinity of the constriction 52. The recess is basically cylindrical in shape and has a narrow annular shoulder 56 approximately in the centre of the curved surface. The recess 54 is connected to the section 48 via a channel 58 and to the section 50 via a channel 60.

A cover 62 having an anode 64 is seated within the recess 54. The edge of the cover 62 rests on the annular shoulder 56. The cap is fixed in place in the block 10 by means of glass-solder 66. Covers 68 and 70 are seated in the recesses 42 and 46, respectively, of the ceramic block 10. These covers too are sealingly fixed in their respective recesses 42 and 46 in the ceramic block 10 by means of glass-solder joints 72 and 74. Cathodes 76 and 78 are located within the covers 68 and 70, respectively.

The dielectric mirrors 26, 28 and 30 are held in adjustable holders 80, 82 and 84. The dielectric mirrors 26, 28 and 30 take the form of flat-cylindrical bodies. Thus, they each have a circular cross-section. The adjustable holders 80, 82 and 84 are all formed in the same manner. In the following therefore, only the adjustable holder 82 will be described in detail. The adjustable holder 82 comprises an outer holder part 86 which surrounds the inner section of the curved surface of the mirror 28. The outer holder part 86 merges into an inwardly extending section 88. The section 88 is provided with a flange 90 which lies against the front surface of the mirror 28. The adjustable holder 82 then curves outwardly again, thereby forming an inner rim 92. An annular disk-like section 94, which is parallel to the flange 90, extends outwardly from the inner rim 92. The inwardly extending section 88 then merges into a substantially cylindrical inner holder part 96, which is substantially in alignment with the outer holder part 86. The inner holder part 96 is sealingly fixed in the recess 22 by means of a glass-solder joint 98.

The guide channel 12 and the recesses 20, 22, 24, which are connected thereto and sealed by the respective mirrors 26, 28, 30, together with the recesses 54, 42, 46, which are connected to the guide channel 12 and sealed by the respective covers 62, 68, 70, are filled with a low pressure mixture of helium and neon. By applying a voltage across the anode 64 and the cathodes 76 and 78, two gas discharges are created between, on the one hand, the anode 64 and the cathode 76 via the channel 58, the section 48 and the section 36, and, on the other hand, between the anode 64 and the cathode 78 via the channel 60, the section 50 and the section 38. Consequently, the neon atoms are raised into an excited state. Since neon consists of two isotopes, the excited states have slightly different energy levels. By adjusting the mirrors 26, 28 and 30, it is possible to guide the light beams through the constriction 52 and exactly along the sides 14, 16 and 18 of the equilateral triangle. As a result of such an adjustment, a stimulated emmission of radiation is caused and a coherent laser beam thereby created. One of the waves thus travels clockwise and another one anti-clockwise. However, the two neon isotopes and the two gas-discharge ensure that waves circulating in both directions occur. The guide channel 12 forms a resonant cavity for the gas ring-laser.

If now, the gas ring-laser is rotated about an axis perpendicular to the plane of the paper containing the Figure, then the optical path lengths of the clockwise and anti-clockwise travelling light waves differ due to the Sagnac-effect. The gas ring-laser frequencies for these two directions of circulation alter correspondingly in the opposite sense. The beat frequency provides a measure of the angular velocity of the gas ring-laser. The beat frequency is obtained by coupling-out portions of the left- and right-circulating light waves and causing them to mutually interfere.

The gas ring-laser described above is produced in the following way:

Firstly, a blank is formed from so-called "green" ceramic. This is a ceramic material that can be machined i.e. it can be bored and milled. These are the operations to which the blank is initially subjected. Bores are drilled along the sides 14, 16 and 18 of the equilateral triangle. The bores inserted from the top of the Figure (viz from the vicinity of the recess 22) extend to a little beyond the mid-point of the sides of the triangle and are of relatively large cross-section. The bores made from the opposite side of the Figure i.e. from the lower left (recess 20) and the lower right (recess 24), are effectively capillary counterbores. The bores which provide the channels 44 and 40, are drilled along the lines which bisect the angles between the sides 14 and 18, and the sides 16 and 18, respectively.

The section 48 is drilled from the left in the Figure, while the section 50 is bored from the right.

Thereafter, the recesses 20, 22, 24 and the recesses 42, 46, 54 are milled. The channels 58 and 60 are bored in the base of the recess 54. A further, finer boring along one of the sections 48 or 50 provides the constriction (pinhole) 52.

The thus-machined blank is then heated to a high temperature. The green ceramic is thereby sintered into a glass ceramic. A certain amount of shrinkage occurs during sintering. This shrinkage needs to be taken into account during the initial dimensioning and boring of the blank.

Thereafter, the covers 62, 68 and 70 are fixed in the recesses 54, 42 and 46 by means of glass-holder. Similarly, the mirrors 26, 28, 30 in their adjustable holders 80, 82, 84 are fixed in the recesses 20, 22, 24 by means of glass-solder. In a not shown manner, the thus-formed closed cavity is filled with the low-pressure helium-neon mixture. Gas discharges are set up between the anode 64 and the cathodes 76 and 78. The mirrors 26, 28 and 30 are then adjusted in two directions by means of the adjustable holders as indicated by the arrows. The adjustments continue until the required left- and right-circulating laser beams are obtained. Once the correct adjustment has been made, the mirrors are fixed in position by means of a suitable sealing compound.

What is claimed is:

1. A gas ring laser comprising a ceramic block, a closed-path, polygonal, gas-filled passage defined in said ceramic block, said passage having corners, electrodes arranged to create, in operation, a gas discharge in said passage, and mirrors arranged in said corners for causing light beams to circulate in opposite directions along said closed-path passage, whereby said passage forms a cavity of said gas ring laser, characterized in that said ceramic block consists of sintered green ceramic.

2. A gas ring laser as claimed in claim 1, wherein said passage communicates, at said corners, with recesses extending from the peripheral surface of said ceramic block, said mirrors being held in deformable jacket-shaped holders, which hold said mirrors along their peripheries and which are sealingly fixed in said recesses, said deformable holders being fixed in position by means of a sealing compound.

3. A gas ring laser as claimed in claim 2, wherein said mirrors are flat cylindrical bodies having a curved, cylindrical peripheral surface, and each of said deformable holders comprises an outer portion surrounding said cylindrical peripheral surface of the associated mirror, a median portion of u-shaped cross section, and a substantially cylindrical inner portion, said median portion forming a flange, which engages the inner end face of said associate mirror, and said inner portion being sealingly fixed in said recess.

4. A gas ring laser as claimed in claim 3, wherein said holders are sealingly held in said ceramic block by glass solder.

5. A gas ring laser as claimed in claim 2, wherein said holders are sealingly held in said ceramic block by glass solder.

6. A gas ring laser as claimed in claim 1 wherein said passage extends along a triangular path composed of three communicating straight portions, said block having an anode recess in its peripheral surface, said anode recess communicating with a first one of said portions of said passage, said recess being covered by a cap-shaped cover, which is sealingly fixed in place in the recess by glass solder, said cover carrying an anode as one of said electrodes, said block, furthermore, having cathode recesses in its peripheral surface, each one of said cathode recesses communicating with a second one and a third one, respectively, of the remaining straight portions of said passage, each one of said cathode recesses being closed by a cap-shaped cover which is sealingly fixed in place in the respective recess by glass solder, each one of said covers carrying a cathode as another one of said electrodes, gas discharges, in operation, taking place between said anode and said cathodes.

7. A gas ring laser as claimed in claim 6, wherein said first straight portion comprises a first section and a second section, said sections being interconnected by a restriction, said anode recess communicating with said first section through a first passage and with said second section through a second passage.

8. A gas ring laser as claimed in claim 7, wherein said second and third straight portions of said passage comprises a relatively large diameter section and a relatively small diameter section each, said relatively large diameter sections being adjacent to that one of said mirrors which is opposite said first straight portion of said passage, said cathode recesses communicating with an associated one of said relatively small diameter sections.

9. A gas ring laser as claimed in claim 8, wherein said anode recess is diametrically opposite said one mirror and said cathode recesses are diametrically opposite one of the remaining mirrors each.

10. A method of making a gas ring laser of the type having a ceramic block, a closed-path, polygonal, gas-filled passage defined in said ceramic block, said passage having corners, electrodes arranged to create, in operation, a gas discharge in said passage, and mirrors arranged in said corners for causing light beams to circulate in opposite directions along said closed-path passage, whereby said passage forms a cavity of said gas ring laser, comprising the steps of
(a) pressing a machinable blank from non-sintered ceramic material,
(b) machining said blank to form said closed-path, polygonal passage therein,
(c) heating said machined blank so as to convert the ceramic material into a glass ceramics by sintering, and
(d) mounting said mirrors and electrodes on the ceramic block thus obtained.

11. A method as claimed in claim 10, wherein said non-sintered material is green ceramics.

12. A method as claimed in claim 10, wherein the step of mounting said mirrors comprises the steps of
(a) machining, in said machinable blank, recesses extending from the peripheral surface of said blank and communicating, at said corners, with said passage,
(b) mounting said mirrors in deformable jacket-shaped holders, which hold said mirrors along their peripheries,
(c) sealingly fixing said deformable holders in said recesses,
(d) adjusting said mirrors, and
(e) fixing said mirrors in position by means of a sealing compound.

13. A method as claimed in claim 12, wherein said mirror adjusting step is carried out after complete assembly of the gas ring laser, the laser being operated by applying voltages to said electrodes to cause gas discharge, said mirrors being then tilted in their respective deformable holders until laser beams circulating in opposite directions in said passage are obtained, said step of fixing the mirrors being carried out, after such laser beams occur.

14. A method as claimed in claim 13, wherein the deformable holders are sealingly fixed in the respective recesses by means of glass solder.

15. A method as claimed in claim 12, wherein the deformable holders are sealingly fixed in the respective recesses by means of glass holder.

16. A method as claimed in claim 10, wherein the step of mounting the electrodes, in turn, comprises the steps of:
(a) machining in said blank from the peripheral surface thereof recesses so that these recesses communicate with said passage,
(b) providing cap-shaped covers, each one of which carries an electrode,
(c) after said blank has been converted to glass ceramic by sintering, placing said covers into said recesses and sealingly fixing the covers by glass solder.

17. A method as claimed in claim 10, wherein said blank is pressed and machined to slightly larger dimensions than those of the block in the finished ring laser to allow for shrinkage during the sintering process.

18. A gas ring laser comprising a ceramic block, a closed-path, polygonal, gas-filled passage defined in said ceramic block, said passage having corners, electrodes arranged to create, in operation, a gas discharge in said passage, and mirrors arranged in said corners for causing light beams to circulate in opposite directions along said closed-path passage, whereby said passage forms a cavity of said gas ring laser, characterized in that said ceramic block consists of sintered green ceramics and said mirror are mounted in adjustable holders permitting adjustment of said mirrors relative to said ceramic block.

* * * * *